United States Patent [19]

Kawamura et al.

[11] 4,260,878

[45] Apr. 7, 1981

[54] MANAGEMENT SYSTEM FOR COPYING MACHINES

[75] Inventors: Michio Kawamura, Kariya; Takeshi Kato, Funabashi; Kouji Ohira, Tokyo; Katsusuke Nishimura, Chiba; Kazuaki Mitsui, Kunitachi, all of Japan

[73] Assignees: Nippondenso Co., Ltd., Kariya; Systemkiki Co., Ltd.; Fuji Xerox Co., Ltd., both of Tokyo, all of Japan

[21] Appl. No.: 4,478

[22] Filed: Jan. 18, 1979

[30] Foreign Application Priority Data

Feb. 3, 1978 [JP] Japan .................................. 53-11771

[51] Int. Cl.³ .............................................. G06M 3/08
[52] U.S. Cl. ............................ 235/92 AC; 235/92 SB
[58] Field of Search .......... 235/92 SB, 92 SA, 92 AC; 355/14 R, 14 CU, 14 C, 6

[56] References Cited

U.S. PATENT DOCUMENTS

| 3,427,441 | 2/1969 | Swords | 235/92 AC |
| 3,917,924 | 11/1975 | Linne | 235/92 AC |
| 3,997,873 | 12/1976 | Thornton | 235/92 AC |

*Primary Examiner*—Joseph M. Thesz
*Attorney, Agent, or Firm*—Cushman, Darby & Cushman

[57] ABSTRACT

A management system for a copying machine includes a detection circuit for determining whether the information representing a department of the user recorded on a magnetic card is properly read and for providing an operation signal to the copying machine to make it operable. A memory unit having a plurality of storage locations counts a pulse signal generated by the copying machine everytime a copy is produced and stores the date indicative of the total number of produced copies at a storage location assigned in accordance with the read-out information of a department. The total number of copies produced by each of different departments of users is displayed together with the indication of the department by a visual display unit.

8 Claims, 5 Drawing Figures

MANAGEMENT SYSTEM FOR COPYING MACHINES

The present invention relates to management of copying machines, and more particularly the invention relates to a management system for a copying machine which is capable of satisfactorily performing a separate management of the number of copies produced by the respective departments of the users jointly using the machine.

In the past, with a copying machine used for producing copies from original documents or the like, a separate management of the copying machine has been performed for its respective departments of users in a corporation principally with reference to the number of copies produced by each department so as to charge the corresponding copying expense to individual departments. For this purpose, a so-called key counter including an electromagnetic counter and a key switch for applying operation commands to the copying machine has been used. The key counter is in the custody of each department and it is electrically connected to the copying machine each time the copying machine is used by a person who belongs to the department. The electromagnetic counter includes a step motor and digit indicator rings for several digits, whereby the copy pulses produced one for every copying operation of the copying machine are sequentially counted and the count is stored and displayed by the digit indicator rings. Also the key counter is important in that the key counters serve the function of limiting the user's departments by means of the key switches. In other words, it is inhibited to use the copying machine without a key counter.

However, there is the disadvantage that since the individual key counters have their own built-in function to indicate a data for the number of copies produced and since they are in the custody of the respective departments to serve the function of limiting the users to any of the departments, it is impossible to collectively grasp the data for the numbers of copies produced by the respective departments of the users.

With a view to overcoming the foregoing deficiency, it is an object of the invention to provide an improved management system which is integral with a copying machine and including a general memory means for both separately and collectively storing and counting data for the numbers of copies produced by the respective departments of the users, wherein with the aid of a portable information record medium issued to each of the departments, each of the departments is allowed to assign corresponding one of the retrievable addresses in the general memory means.

It is another object of the invention to provide such management system including command means whereby when the information recorded on the portable medium is read from the medium to assign the address of the general memory means corresponding to the user's department, a command signal for enabling the operation of the copying machine is applied to the machine only upon detection of the proper reading operation, thus inhibiting the utilization of the copying machine by any department having no prescribed portable information medium carrying the required user's department information and thereby limiting the utilization of the copying machine only to the qualified departments.

It is still another object of the invention to provide such management system including display means connected to the general memory means, whereby when the copying machine is set to be operable by one of the user of a particular department, the total count (the stored number of copies data) of the copies produced by the users of the department utilizing the portable medium is displayed on the display means in common.

The invention will be apparent from the following detailed discription taken in conjunction with the accompanying drawings, in which.

Figure 1:
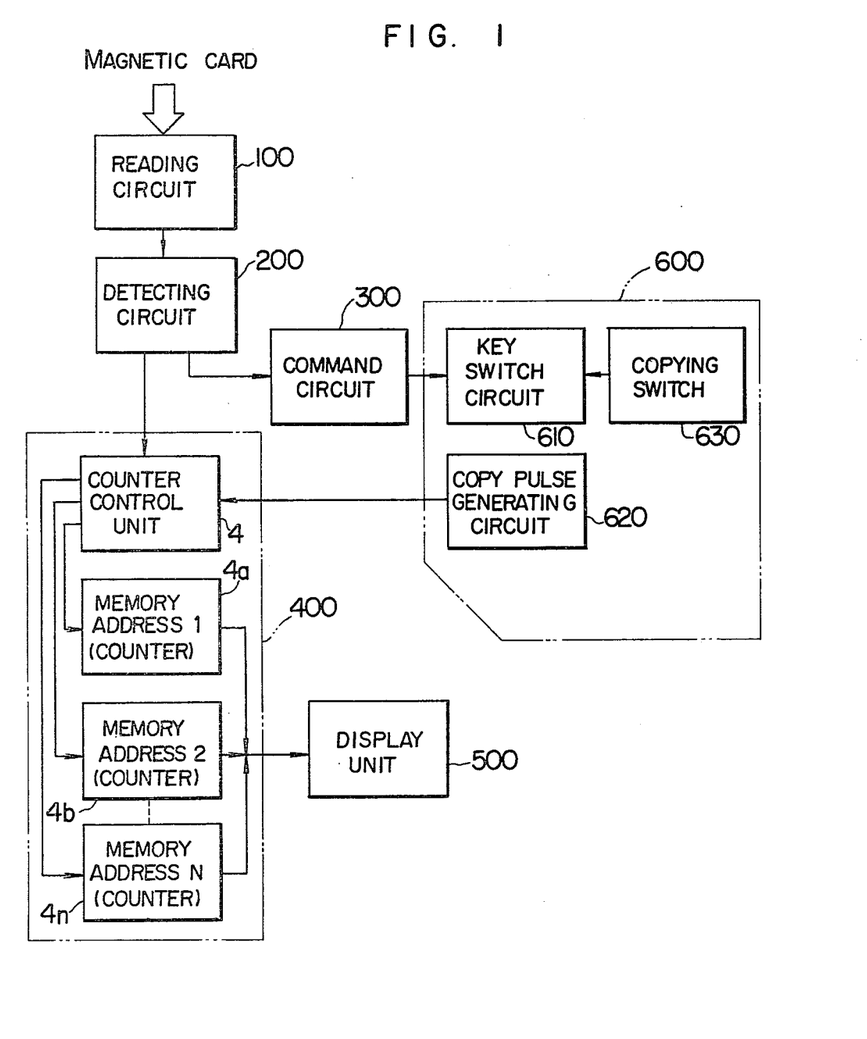
FIG. 1 is a block diagram showing the overall construction of a management system for a copying machine according to the invention.

The present invention will now be described with reference to the illustrated embodiment. Referring first to FIG. 1, numeral 100 designates a reading circuit whereby the information magnetically recorded on a magnetic card or portable information record medium which is not shown is converted into an electric signal. The magnetic card is issued to each of a plurality of departments of the users which utilize a copying machine in common, and each magnetic card has recorded thereon a combination of information consisting of user's department information specific to each department and guide information indicating the location of the user's department information. In this case, by issuing to each department a plurality of magnetic cards having recorded thereon the same user's department information, it is possible to allow each of the personnel of the same department to directly utilize the copying machine.

Numeral 200 designates a detecting circuit to detect whether the operation of the reading circuit 100 has been performed properly. In other words, when the proper magnetic card is not used, when the recorded information has been deformed or when the proper magnetic card is used but its information is not read accurately, the control of the system by the card is inhibited, and only in response to the proper reading of the information on the card a proper read signal is generated to enable the succeeding electrical processes. For instance, the guide information may include a key information peculiar to the copying machine thus allowing to discriminate whether the key information agrees with a predetermined information or alternatively it is possible to discriminate whether the volume of the entire read information satisfies a predetermined volume, thus generating a proper read signal when the requirement is met. While, in order to more accurately discriminate whether the reading operation has been performed properly, it is desirable to discriminate directly whether the user's department information itself agrees with any one of a plurality of the preliminarily assigned and issued user's department information, it is possible to indirectly discriminate with a satisfactory accuracy by means of the guide information in the previouly mentioned manner.

Numeral 300 designates a command circuit which is responsive to the proper read signal from the detecting circuit 200 to apply a command signal to a copying machine 600 to enable the copying operations thereof. Usually, the copying machine 600 incorporates a key switch circuit 610, with the power circuit turned on, inhibits or releases the copying operation of the copying machine 600, so that the copying machine 600 is brought into an operable condition in response to the application of the command signal to the key switch circuit 610 and the actual copying operation takes place in response to the closing of a copying switch 630 incorporated in the copying machine proper. When no command signal is applied, no copying operation takes place even if the copying switch 630 is closed. The key switch circuit 610 may, for example, be one designed to establish the AND condition along with the copying switch 630.

Numeral 400 designates a general memory unit for collectively storing and counting data indicative of the number of copies produced by each department. The general memory unit 400 consists of a counter control section 4 and a memory section including a plurality of storage locations 1, 2, ..., N which are retrievable by the counter control section 4. The counter control section 4, in response to the signal indicative of the user's department information read by the reading circuit 100 and applied from the detecting circuit 200, retrieves (assign) the storage location corresponding to the user's department information and supplies to the retrieved storage location the number of copies data from the copying machine 600. The memory section may, for example, employ counters 4a, 4b, ..., 4n for the plurality of storage locations 1, 2, ..., N and in this case the counter control section 4 determines, depending on the user's department signal to which one of the plurality of counters the number of copies data is to be supplied.

The number of copies data consists of the copy pulses which are generated one for every copying operation performed by the copying machine 600 and these copy pulses are sequentially received by the selected counter, one pulse in response to every copying operation performed. These copy pulses are generated by a copy pulse generating circuit 620 incorporated in the internal mechanism of the copying machine 600 and as for example, a method of generating copy pulses is known in which a micro switch is closed each time a copied sheet of paper moving toward a receiving box passes the micro switch.

Thus, the copy pulses are applied only to one of the storage locations 1, 2, ..., N in the memory section which was retrieved in accordance with the read user's department information and the pulses are stored and counted up, thus the number of copies data is stored in the storage location corresponding to the user's department.

Numeral 500 designates a display unit which reads out and displays the number of copies data stored in the storage locations of the memory section. While the display unit 500 may be designed so that it is selectively connected to the storage locations 1, 2, ..., N only when the number of copies data is required, as will be described hereinafter in connection with the detailed description of the drawings, the display unit 500 may be constructed so that when the user's department information of any particular department is read, the number of copies data in the storage location assigned by the user's department information is automatically displayed together with the indication of this particular department. In this case, if the memory section of the general memory unit 400 is constituted by, for example electromagnetic counters each for corresponding one of the storage locations, since each memory address has its own display function, thus there is no need to use any exclusive display unit.

Figure 2:
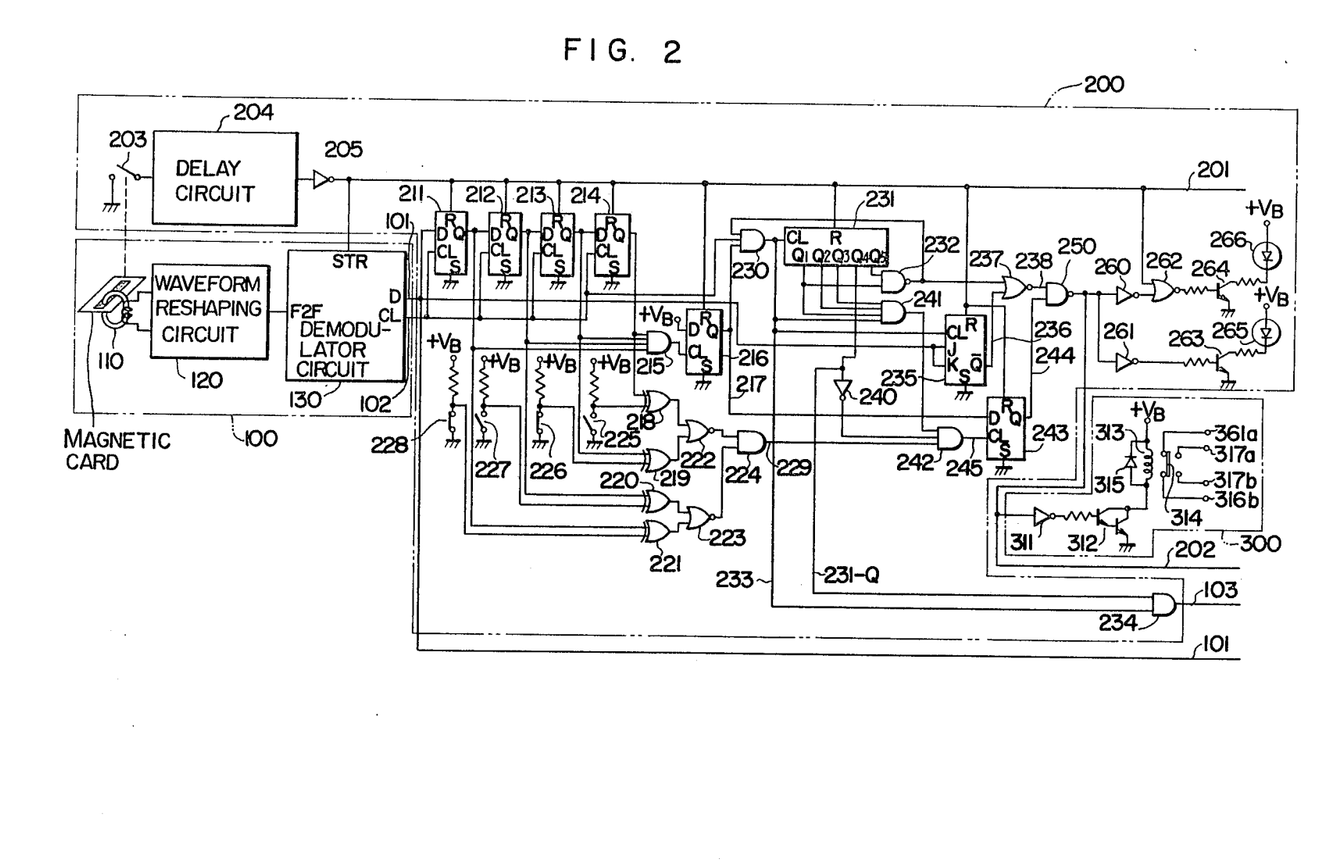
FIG. 2 is a wiring diagram showing in detail the construction of the reading circuit, detecting circuit and command unit used in one embodiment of the system of the invention.
Figure 3:
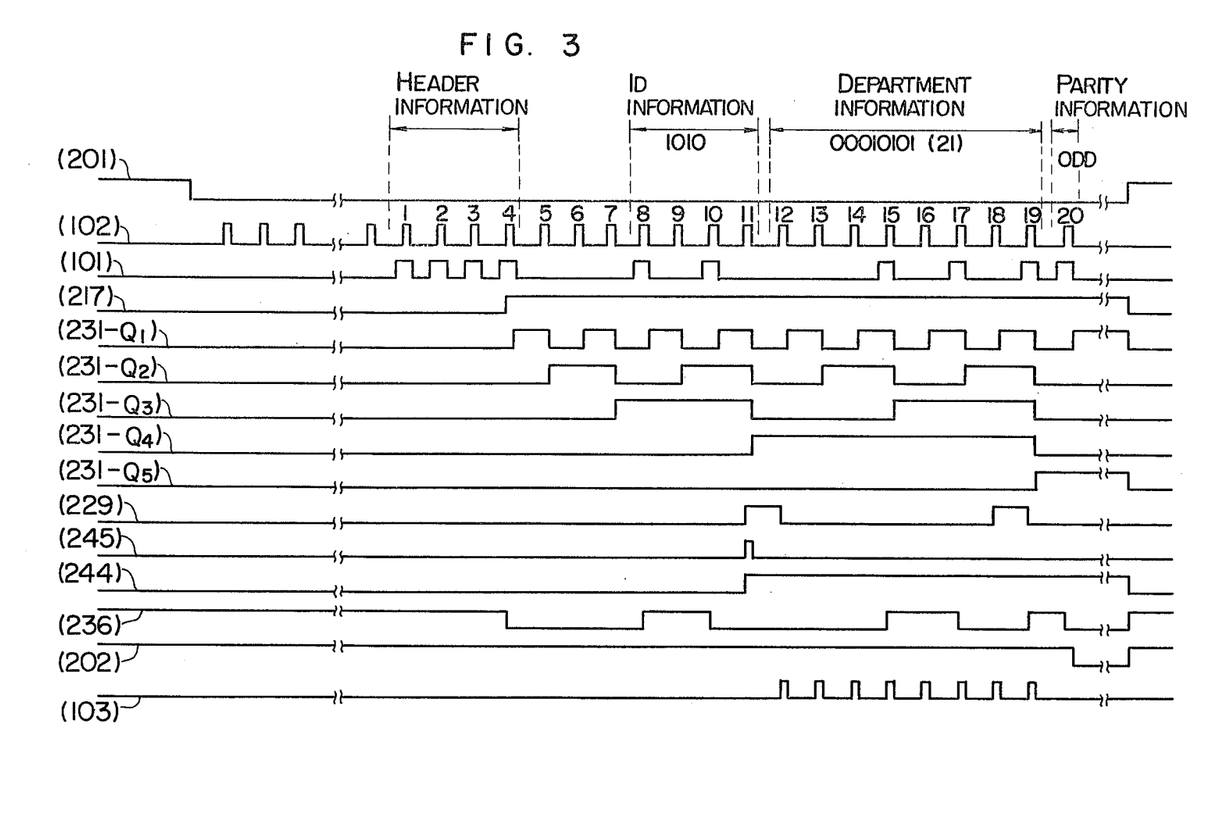
FIG. 3 is a time chart useful in explaining the operation of the circuitry shown in FIG. 2, showing the timing of the signals on the lines designated by the corresponding reference numerals which are not parenthesized.

FIG. 2 is a wiring diagram showing in detail the construction of the reading circuit 100, the detecting circuit 200 and the command circuit 300, and FIG. 3 shows the timing relationships of the operations of these circuits. The power supplies and the ground connections for the individual component elements are shown only those necessary for purposes of description, and the rest is not shown.

Numeral 203 designates a switch for detecting the beginning of reading of a magnetic card and the following reading condition, 204 a delay circuit for delaying the detection signal of the switch 203 a predetermined time and 205 an inverter circuit for inverting the delayed signal, thus constituting a circuit for detecting the reading of the card. When the switch 203 detects that the reading operation of the magnetic card has started, after the expiration of the predetermined time the signal on a line 201 goes from a high level (hereinafter simply referred to as "1") to a low level (hereinafter simply referred to as "0"), and consequently the elements connected to the line 201 are changed from the reset state to the set state. The delay time of the delay circuit 204 is set so as to adjust the timing of operation of the switch 203 and the timing of reading of information by a reading head 110. When the magnetic card is brought out of use (e.g., when the card is removed from the reading head section), after the expiration of the predetermined time a "0" signal is generated on the line 201 and the associated elements are reset.

The reading head 110 may be a magnetic head by which the binary information magnetically recorded on each magnetic card is serially read and converted into electrical signals, 120 a waveform reshaping circuit for amplifying and reshaping the electric signals, and 130 a demodulator circuit for extracting data from the reshaped binary electric signals. The known F2F signals are used for binary information recorded on the magnetic cards, and when F2F signals are read out after the signal on the line 201 has gone to "0", the signal are separated into data and clocks so that the data signals shown in (101) of FIG. 3 are generated on a line 101 and the clock signals shown in (102) of FIG. 3 are generated on a line 102. The detailed construction of this type of demodulator circuit is known in the art by Japanese Patent Laid-Open Applications No. 49-66116, No. 50-85320 (U.S. Pat. No. 3,949,313), etc., and will be described. The F2F signals are recorded on a single channel and they are demodulated by self-clocking. These prior art applications disclose the demodulator constructions capable of satisfactorily extracting the data despite any change in the relative travel speeds of the information record medium and the magnetic head 110.

In FIG. 3, the effective length (the number of bits) of the recorded information corresponds to 20 signals of the clock signals appearing on the line 102 and designated by numerals 1 to 20. The first 4 bits or the signals 1 to 4 are assigned to the header information which indicates the initial part of the information, another group of 4 bits or the signals 8 to 11 to the ID (index) information which indicates the machine number of a copying machine, another group of 8 bits or the signals 12 to 19 to the user's department information which indicates the department of a user, and the last bit or the signal 20 to the parity check. It is predetermined so that of the 8 bits or the signals 12 to 19, the middle 5 bits or the signals 15 to 19 are used as the effective bits. The header information and the ID information are used as guide information which indicates the location of the user's department information and it is also used to discriminate whether the reading operation of the information including the parity information has been carried out properly. The remaining 3 bits or the signals 5 to 7 are used for timing adjusting purposes and no data signal exists in this time interval.

Numerals 211, 212, 213 and 214 in FIG. 2 designate four D-type flip-flops constituting a shift register in which the data signals on the line 101 are shifted and stored in response to every clock signal appearing on the line 102, 215 an AND circuit for producing the logical product of the flip-flop outputs, and 216 a D-type flip-flop for holding a "1" signal from the AND circuit 215. When the succeeding 4 bits of the data signals on the line 101 all go to "1", the outputs Q of the D-type flip-flops 211 to 214 all go to "1", so that a "1" signal is generated at the output terminal of the AND circuit 215, and the signal on a line 217 indicative of the output of the flip-flop 216 is held at "1" as shown in (217) of FIG. 3. This means the detection of the fourth signal of the four data signals 1 to 4 indicative of the header information in the initial part of the information read.

Numeral 230 designates an AND circuit for controlling the passage of the clock signals from the line 102, 231 a frequency dividing counter for dividing and counting the clock signals from the AND circuit 230, and 232 a NAND circuit for detecting that the total count value of the counter 230 has attained a predetermined value (17). When the line 217 goes to "1" in response to the detection of the header information, the AND circuit 230 is opened and consequently the counter 231 generates divided pulses 231-$Q_1$ to 231-$Q_5$ in synchronism with the negative-going transition of the clock signals on the line 102 as shown in (231-$Q_1$) to (231-$Q_5$) of FIG. 3. When the counter 231 counts the 17th clock signal from the 4th clock signal, the output of the NAND circuit 232 immediately goes to "0" and the AND circuit 230 is closed. As a result, a total of 17 clock signals including the 4th to 20th signals are generated on a line 233 through the AND circuit 230.

Numeral 234 designates an AND circuit which is opened for the duration of a "1" signal generated on a line 231-$Q_4$ indicating that the frequency dividing counter 231 is counting the 11th to 18th clock signals, and consequently the 12th to 19th clock signals are passed onto a line 103 as shown in (103) of FIG. 3. The 8 clock signals or the 12th to 19th clock signals generated on the line 103 correspond to the bits of the user's department information.

Numeral 235 designates a J-K flip-flop adapted to change its state in response to every data signal appearing on the line 101 and 237 a NOR circuit, thus constituting a parity check circuit for determining whether the total value of the data signals corresponding to the 4th to 20th clock signals is odd or not. The flip-flop 235 is designed so that if there are the data signals on the line 101 when the clock signals on the line 233 are applied, the output on a line 236 is changed each time as shown in (236) of FIG. 3. Consequently, when the line 236 goes to "1", it is an indication that the total value of the data signals is even, and when the line 236 goes to "0" it is an indication that the total value is odd. The NOR circuit 237 is opened through the NAND circuit 232 in response to the counting of the 20th clock signal by the counter 231 and in this case the NOR circuit 237 generates a "1" signal on its output line 238 only when the line 236 is at "0" indicative of the odd number. With the F2F signals recorded on the magnetiic card, the presence or absence of the parity information data signal corresponding to the 20th clock signal is determined in dependence upon whether the total value of the data signals contained in the ID information and the user representative information is even or odd.

Numerals 218, 219, 220 and 221 designate EXCLUSIVE OR circuits, 222 and 223 NOR circuits, 224 an AND circuit, and 225, 226, 227 and 228 a group of switches for presetting the machine number of the copying machine. The ID information is preset by the switches 225 to 228 to a binary number "1010", so that when the 4 bits or data signals in the shift register become "1010", the outputs of the four EXCLUSIVE OR circuits all go to "0" and the outputs of the two NOR circuits all go to "1", so that as shown in (229) of FIG. 3 the output of the AND circuit 224 on a line 229 goes for the duration of one cycle of the clock signals to "1" indicative of the ID coincidence. The presetting of the ID information may be effected separately for each copying machine by the group of switches 225 to 228.

Numeral 240 designates an inverter circuit, 241 and 242 AND circuits and 243 a D-type flip-flop, thus constituting a discrimination circuit for discriminating and holding whether the coincidence of the ID information has taken place at the 11th clock signal. The inverter circuit 240 and the AND circuit 241 cooperate to receive the signals from the frequency dividing counter 231 indicative of the 11th clock signal and apply "1"s to the inputs of the AND circuit 242 during the time interval. As a result, only under this condition the AND circuit 242 passes the signal generated on the line 229 and indicative of the ID coincidence. The flip-flop 243 receives the signal passed through the AND circuit 242 and generated on a line 245 as shown in (245) of FIG. 3 and it generates on a line 244 the signal shown in (244) of FIG. 3 only on the condition that the "1" signal indicative of the detection of the header information is appearing on the line 217.

Numeral 250 designates a NAND circuit which generates on a line 202 the proper read signal "0" shown in (202) of FIG. 3 only in response to the simultaneous existence of the "1" signal on a line 238 indicative of the proper performance of the parity check and the "1" signal on the line 224 indicative of the proper coincidence the ID information.

Numerals 260 and 261 designate inverter circuits, 262 a NOR circuit, 263 and 264 transistors, 265 a green light emitting diode and 266 a red light emitting diode, thus constituting a conduit which indicates whether the reading of the information has been carried out properly. When the proper read signal "0" is generated on the line 202 so that the output of the inventer 261 goes to "1", the green light emitting diode 265 is turning on. On the other hand, the red light emitting diode 266 is turned on when the output of the NOR circuit 262 goes to "1" in response to the generation on the line 201 of the "0" signal indicating that the reading of the card has been initiated, and it is turned off in response to the proper read signal "0" on the line 202. Consequently, after the completion of the reading operation, if the red light emitting diode 266 is turned on and the green light emitting diode 265 is turned off, it is determined that the reading has not been performed properly.

Numeral 311 designates an inverter circuit, 312 an amplifying transistor, 313 a relay coil, 314 a relay contact, 315 a surge absorbing diode and 316a, 316b, 317a and 317b relay output terminals, constituting a circuit responsive to the proper read signal generated on the line 202 to generate a command signal for enabling the copying machine 600. When the proper read signal "0" is generated, the output of the inverter circuit 311 goes to "1" so that the transistor 312 is turned on and the relay coil 313 is energized, thus changing the position of the relay contact 314. This change of the relay contact position selects either the conduction of the output terminals 316a and 316b or the conduction of the output terminals 317a and 317b, and the selected condition is applied as an input condition to the key switch circuit 610 of the copying machine 600.

Figure 4:
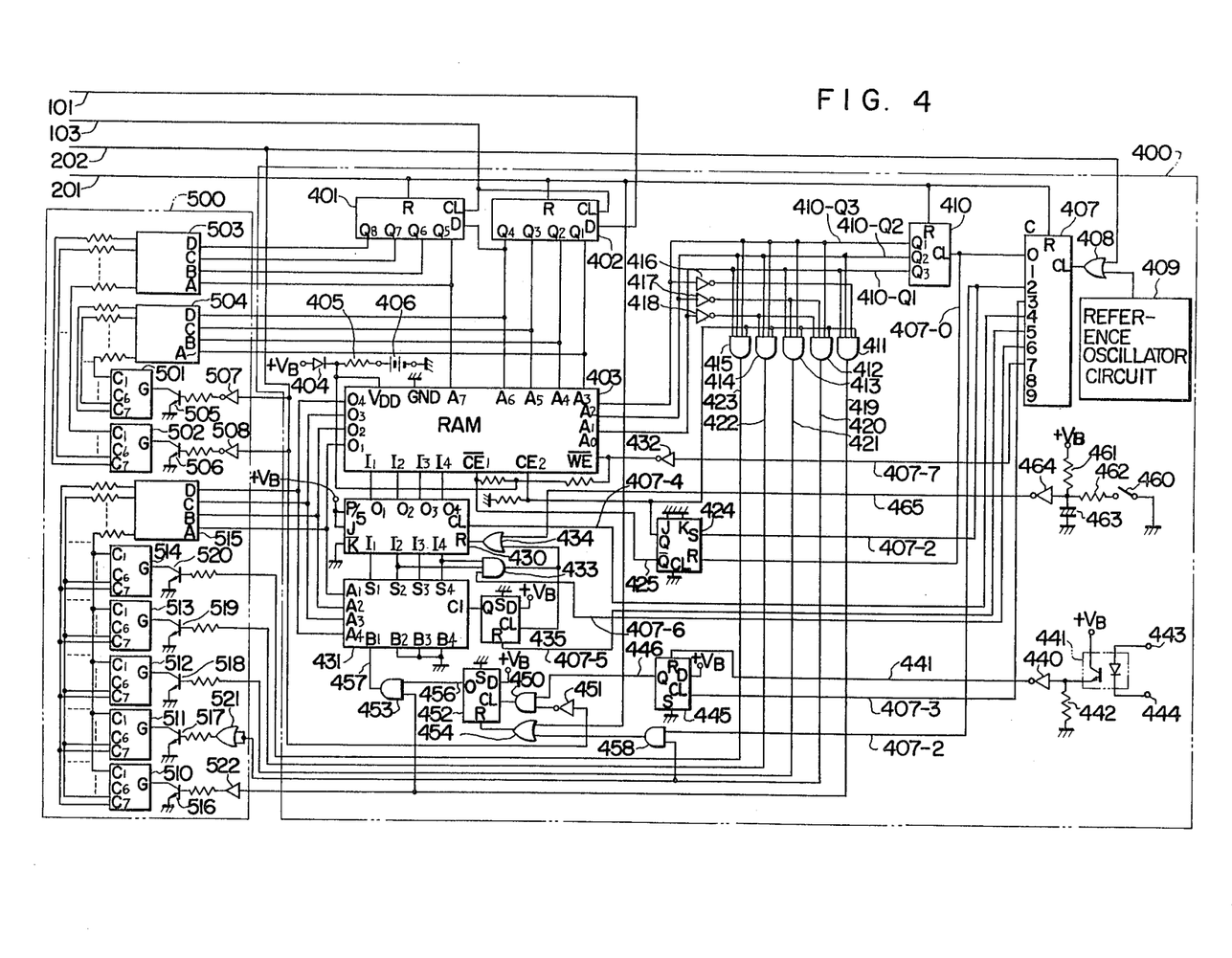
FIG. 4 is a wiring diagram showing in detail the construction of the general memory unit and display unit used in the embodiment of the system of the invention.
Figure 5:
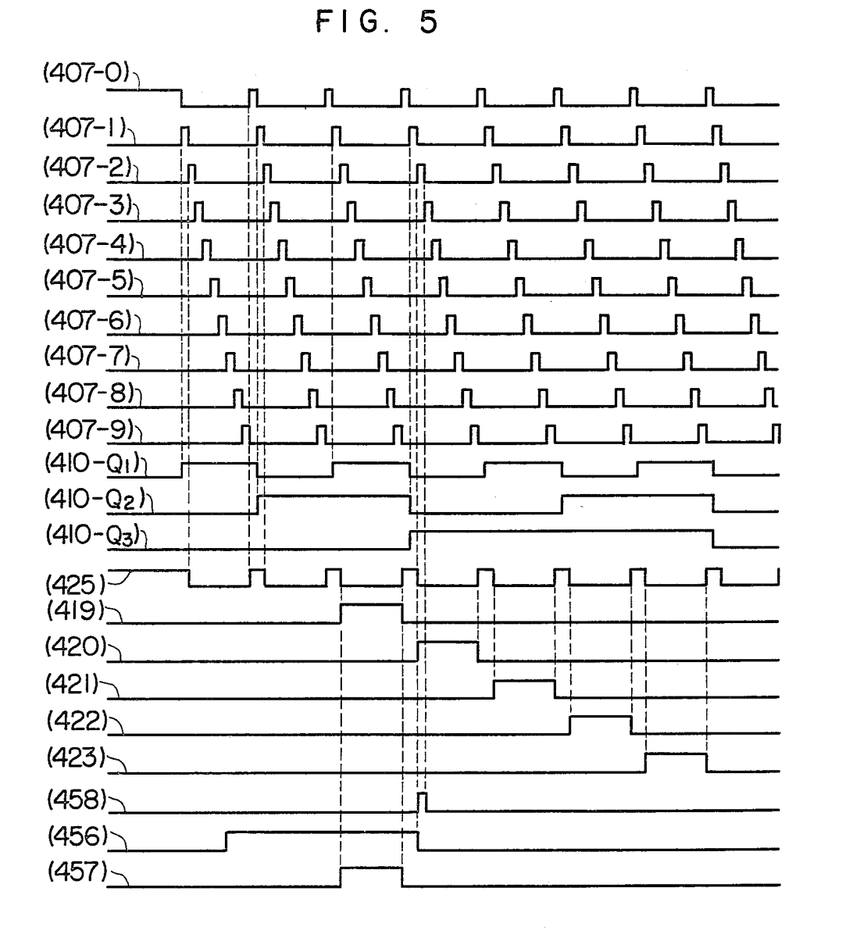
FIG. 5 is a time chart useful in explaining the operation of the circuitry shown in FIG. 4, showing the timing of the signals on the lines designated by the corresponding reference numerals which are not parenthesized.

FIG. 4 is a wiring diagram showing in detail the construction of the general memory unit 400 and the display unit 500, and FIG. 5 shows the timing of the operation of these units. Of the power supplies and the grounds for the individual elements, only those necessary for purposes of description are shown and the remainder is not shown. Lines 101, 103, 201 and 202 are respectively connected to the lines of FIG. 2 designated by the same reference numerals, so that the line 101 delivers the data signals from the demodulator circuit 130, the line 103 delivers only those of the clock signals from the demodulator circuit 130 which correspond to the data signals indicating the user's department information, the line 201 delivers the "0" set signal for setting the elements connected thereto, and the line 202 delivers the "0" proper read signal.

Numerals 401 and 402 designate cascade connected 4-bit shift registers which store the data signals on the line 101 in response to the clock signals on the line 103. As mentioned previously, since the number of clock pulses generated on the line 103 for the reading of every magnetic card is 8 and corresponds to the bits of the user's department information, the shift registers 401 and 402 store only the data signals indicative of the user's department information and a binary signal, e.g., "00010101" generated at their 8 output terminals $Q_1$ to $Q_8$ indicate the data signals corresponding to the user's department information.

Numerals 501 and 502 designate seven-segment light emitting indicators, 503 and 504 indicating decoder circuits of a known type, 505 and 506 transistors and 507 and 508 inverter circuits, thus constituting a department display circuit. When the transistor 506 is turned on by the "0" or proper read signal from the line 202, a common grounded circuit is provided for the light emitting indicators 501 and 502 so that the indicators 501 and 502 are lit to display a decimal number in response to the control signals from the decoder circuits 503 and 504 or a BCD (binary-coded decimal) code signal converted from the binary signal generated at the output terminals of the shift registers 401 and 402. This decimal number indicates the identification (code number) of a user's department. For instance, a binary number "00010101" is displayed as "21".

Numeral 403 designates a known type of RAM (random access memory) constituting a memory means having a plurality of memory addresses. Terminals $A_0$ to $A_7$ of the RAM 403 indicate address selection terminals, a terminal $\overline{WE}$ is a write enable terminal, $\overline{CE_1}$ and $CE_2$ are chip select terminals, $I_1$ to $I_4$ are write input terminals and $O_1$ and $O_4$ are read output terminals. When "0" and "1" read common signals are simultaneously applied respectively to the chip select terminals $\overline{CE_1}$ and $CE_2$, the memory address corresponding to the binary signal applied to the address selection terminals $A_0$ to $A_7$ is selected and the binary signal stored in the selected address is generated at the read terminals $O_1$ to $O_4$. The binary signal generated at the read terminals $O_1$ to $O_4$ is not established as long as the read command signals are not applied. At the stage where the read command signals have been applied and the memory address corresponding to the binary signal applied to the address selection terminals $A_0$ to $A_7$ has been selected, when a "0" or write command signal is applied to the write enable terminal $\overline{WE}$, the binary signal which has previously been stored in the selected memory address is erased and the binary signal applied to the write terminals $I_1$ to $I_4$ is newly stored in the memory address.

With the address selection terminals $A_0$ to $A_7$ of the RAM 403, the 5 bits at the terminals $A_3$ to $A_7$ are assigned to the effective 5 bits corresponding for example to "10101" of the binary signal "00010101" indicative of the user's department information, and the remaining 3 bits at the terminals $A_0$ to $A_2$ are assigned to a binary signal which indicates the digit of the number of copies data to be stored, that is, the units, tens, hundreds, thousands or ten thousands digit of the decimal number.

Numeral 407 designates a decade ring counter, 408 an OR circuit and 409 a reference oscillator circuit, constituting a timing pulse generating circuit for generating timing pulses which control the timing of reading and writing operations of the RAM 403. When a "0" or proper read signal is generated on the line 202, the OR gate 408 applies the clock pulses from the reference oscillator circuit 409 to the ring counter 407. As a result, the ring counter 407 successively generate timing pulses at its output terminals 0 to 9 at the period of the clock pulses. Of these timing pulses, the timing pulses generated at the output terminals 0, 2, 3, 4, 5, 6 and 7 are delivered, as shown in (407-0), (407-2), (407-3), (407-4), (407-5), (407-6) and (407-7) of FIG. 5, to lines (407-0), (407-2), (407-3), (407-4), (407-5), (407-6) and (407-7), respectively, and consequently the operation of the elements connected to these lines are controlled. The OR circuit 408 controls so that the reading and writing operations in the RAM 403 are effected in response to the generation of the "0" proper read signal.

Numeral 410 designates a frequency dividing counter, 411, 412, 413, 414 and 415 AND circuits, 416, 417 and 418 inverter circuits and 424 an R-S flip-flop, thus constituting a circuit for assigning the digits of the number of copies data. The frequency dividing counter 410 generates on its output lines 410-$Q_1$, 410-$Q_2$ and 410-$Q_3$ the pulses shown in (410-$Q_1$) to (410-$Q_3$) of FIG. 5 in response to the timing pulses generated on the line 407-0, and these binary pulses are applied as such to the address selection terminals $A_0$ to $A_2$ of the RAM 403 as a binary signal which determines the digit of the number of copies data. The flip-flop 424 is set by the timing pulse on the line 407-2 and reset by the timing pulse on the line 407-0, thus generating in the set state a "1" signal and "0" signal on lines 425 and $\overline{425}$, respectively, as shown in (425) of FIG. 5. As a result, during the time interval between the application of the timing pulse to the line 407-2 and the following application of the timing pulse to the line 407-0 the RAM 403 receives the read command signals at the chip select terminals $\overline{CE_1}$ and $CE_2$ so that the memory address selected by the binary signal applied to the address selection terminals $A_0$ to $A_2$ and representing the digit of the number of copies data and the binary signal applied to the address selection terminals $A_3$ to $A_7$ and representing the department, is searched for each digit position of the number of copies data and the number of copies data stored in the retrieved storage location is read out digit by digit and recurrently generated in binary signal form at the read terminals $O_1$ to $O_4$ from the units digit up to the ten thousands digit. The AND circuits 411, 412, 413, 414 and 415 and the inverter circuits 416, 417 and 418 convert the binary pulses on the lines 410-$Q_1$, 410-$Q_2$ and 410-$Q_3$ into decimal pulses and the decimal pulses representing the digits of the number of copies data are sequentially delivered onto lines 419, 420, 421, 422 and 423 in synchronism with the "1" signals on the line $\overline{425}$.

Numerals 510, 511, 512, 513 and 514 designate seven-segment light emitting indicators, 515 an indicating decoder circuit, 516, 517, 518, 519 and 520 transistors and 521 and 522 signal interference preventing buffer elements, constituting a display circuit for number of copies data. The decoder circuit 515 converts to 7-segment display BCD signals the numerical values (binary signals) representing the digits of the number of copies data and generated recurrently at the read terminals of the RAM 403. On the other hand, the transistors 516, 517, 518, 519 and 520 are sequentially turned on by the decade pulses sequentially generated on the lines 419, 420, 421, 422 and 423, thus establishing a grounded circuit for the indicators 510, 511, 512, 513 and 514, respectively. The numerical values representing the digits of the number of copies data and generated at the read terminals $O_1$ to $O_4$ of the RAM 403 agree with the decimal pulses sequentially generated on the lines 419, 420, 421, 422 and 423 as shown in (419) to (423) of FIG. 5 with respect to the timing of indication and generation of the digits. As a result, the five indicators 510 to 514 are sequentially lit from the units digit indicator 510 to the ten thousands digit indicator 514, thus displaying the number of copies data in numerical form. While this display is effected intermittently, the frequency of the clock pulses from the reference oscillator circuit 409 is selected sufficiently high and consequently the display appears to be stationary to the eyesight of man.

Numeral 430 designates a known type of latch, 431 a known type of adder and 432 an inverter circuit, constituting a circuit whereby the binary signal generated at the read terminals $O_1$ to $O_4$ of the RAM 403 is rewritten into the RAM 403, and when a copy pulse is generated from the copying machine the binary signal is rewritten into the RAM 403 after the addition of a numerical value "1" thereto. The adder 431 includes first input terminals $A_1$ to $A_4$ and second input terminals $B_1$ to $B_4$ which receives a binary signal for addition, a third input terminal Ci for receiving a carry numeric value of "1" and output terminal $S_1$ to $S_4$ for generating the result of addition in the form of a binary signal. In the adder 431, the first input terminals $A_1$ to $A_4$ are respectively connected to the read terminals $O_1$ to $O_4$ of the RAM 403, and excluding the higher 3 bits or the terminals $B_2$ to $B_4$ of the second input terminals $B_1$ to $B_4$, only the input terminal $B_1$ is used. Only when a copy pulse is generated in the copying machine, a binary signal "0001" is applied to the second input terminals $B_1$ and $B_4$, and at the instant that the binary signals are applied to the first and second input terminals the result of the addition is generated at the output terminals $S_1$ to $S_4$. In this case, if there is a "1" signal at the third input terminal, a binary signal "0001" is further added to the sum of the first and second input binary signals and the result of the addition is generated at the output terminals $S_1$ to $S_4$. When there are no addition signals at the second and third input terminals, the binary signal at the first input terminals is generated as such at the output terminals.

The latch 430 includes input terminals $I_1$ to $I_4$ connected to the output terminals of the adder 431 and output terminals $O_1$ to $O_4$, and the binary signal applied to the input terminals $I_1$ to $I_4$ is held at the output terminals $O_1$ to $O_4$ in response to the timing pulse applied to its clock terminal CL from the line 407-4. When a "1" signal is applied to its reset terminal R, a binary signal "0000" is set in the latch and the binary signal "0000" is held at the output terminals $O_1$ to $O_4$ in accordance with the previously mentioned timing of the latch.

A write command signal is applied by the timing pulse on the line 407-7 to the write enable terminal $\overline{WE}$ of the RAM 403, and in synchronism with this signal the binary signal held at the output terminals $O_1$ to $O_4$ of the latch 430 is written into the retrieved storage location.

Numeral 433 designates an AND circuit, 434 an OR circuit and 435 a D-type flip-flop, thus constituting a carry circuit for the previously mentioned addition. The AND circuit 433 passes the timing pulse on the line 407-6 when the binary signal indicative of the result of the addition at the terminals $S_1$ to $S_4$ attains "1010" corresponding to the decimal number 10. The timing pulse is applied to the reset terminal R of the latch 430 through the OR circuit 434 and the internal signal of the latch is set to "0000" corresponding to the decimal number 0. On the other hand, the flip-flop 435 is set by the timing pulse applied from the line 407-6 through the AND circuit 433 and a numerical value "1" for carry is held at the third input terminal Ci of the adder 431. As a result, when the result of the addition in the units digit position of the number of copies data attains the decimal number 10, "0000" is written into the RAM 403 and the numerical value 1 held in the flip-flop 435 is added for carry in the adder 431 in response to the reading of the tens digit of the number of copies data from the RAM 403 and the result is written into the RAM 403 through the latch 430. A carry from the tens digit position to the hundreds digit position is effected in the similar manner and so a carry from the hundreds digit position to the thousands digit position and a carry from the thousands digit position to the ten thousands digit position. Each time a carry is completed, the flip-flop 435 is reset by the timing pulse on the line 407-5.

Numeral 440 designates an inverter circuit, 441 a photo coupler, 442 a resistor, 443 and 444 terminals connected to the copy pulse generating circuit in the copying machine and 445 a D-type flip-flop, thus constituting a circuit for receiving the copy pulses from the copying machine. When a voltage is produced across the terminals 443 and 444 in response to the operation of the copying machine, a "0" copy pulse is generated on a line 441 through the photo coupler 441 and the inverter circuit 440. This "0" copy pulse is applied to the reset terminal R of the flip-flop 445 to set it. In the set state the flip-flop 445 generates and holds a "1" signal on a line 446 in synchronism with the timing pulse on the line 407-3.

Numerals 450, 453 and 455 designate AND circuits, 451 an inverter circuit, 452 a D-type flip-flop and 454 an OR circuit, thus constituting a circuit whereby the "1" signal held on the line 446 in response to the generation of the copy pulse is held as an addition signal for the adder 431. The "1" signal held on the line 446 is applied to the flip-flop 452 only when the inverted "1" signal of the "0" proper read signal on the line 202 is applied to the AND circuit 450. In other words, even if a "1" signal is held on the line 406 prior to the occurrence of proper reading, the AND circuit 450 considers the signal as an erroneous signal and inhibits its passage. After the proper read signal has been generated, the flip-flop 452 generates and holds on a line 456 the "1" signal shown in (456) of FIG. 5. The AND circuit, 453 is opened by a "1" signal generated on the line 419 and selecting the units digit of a number of copies data, so that only in response to the simultaneous existence on the line 456 of the previously mentioned "1" signal indicative of the presence of the copy pulse, the "1" signal shown in (457) of FIG. 5 and indicative of the addition of one to the number of copies data, is applied to the second input terminal $B_1$ of the adder 431 through the line 457.

The AND circuit 455 is opened by a "1" signal generated on the line 420 and selecting the tens digit of the number of copies data, so that the timing pulse on the line 407-2 is passed onto a line 458 and the flip-flop 452 is reset through the OR circuit 454. In other words, since the "1" signal on the line 419 indicative of the units digit of the number of copies data is generated from the AND gate 411, when the next "1" signal following the addition is generated, the generation of a "1" addition signal without the generation of a copy pulse is prevented.

In this connection, generally the timing of addition of a number of copies data is much lower than the frequency which determines the intervals of reading operation for the units digit of a number of copies data, and consequently the RAM 403 is allowed to accurately perform the desired copy by copy addition of the number of copies data. The result of the addition is read out from the RAM 403 and displayed on the indicators during the next read cycle.

Numeral 404 designates a diode, 405 a resistor and 406 a rechargeable battery, thus constituting main and auxiliary power circuits. The auxiliary battery 406 is charged from a 30 $V_B$ supply terminal through the diode 404 and the resistor 405, so that when the system supply voltage $+V_B$ is interrupted, the necessary power for holding the data is still supplied to a supply terminal $V_{DD}$ of the RAM 403 from the battery 406 by way of the resistor 405.

Thus, there have been clearly described the detailed construction and operation of the management system covering from the reading of the information on the magnetic card to the storing and counting of the number of copies data. When the user's department information of the information recorded on a magnetic card is different from that of the above-mentioned case (the binary number "00010101"), a different binary signal is applied to the 5 bits or terminals $A_3$ to $A_7$ of the address selection terminals of the RAM 403 and the storage location corresponding to the binary signal is retrieved, after which the similar operations as mentioned previously are carried out.

Numeral 460 designates a switch, 461 and 462 resistors, 463 a capacitor and 464 an inverter circuit, thus constituting a circuit for erasing the number of copies data stored in each storage location of the RAM 403. The switch 460 is normally opened thus generating a "0" signal on a line 465. When the switch 460 is closed, the charge on the capacitor 463 is discharged through the resistor 462 and the switch 460 and after the expiration of a predetermined time the signal goes to "1" thus providing a cancel signal. This "1" cancel signal on the line 465 is applied to the reset terminal R of the latch 430 through the OR circuit 434. Thus, assuming now that the information on the magnetic card has been read and the read/write cycle is being performed recurrently, the binary signals indicative of the numeric values of the digits of the number of copies data are successively erased in the latch 430, thus instantaneously erasing the number of copies data in the storage location corresponding to the user's department information recorded on the magnetic card. Of course, the digits displayed on the indicators 510 to 514 are changed to "00000". The time constant of the resistors 461 and 462 and the capacitor 463 is so selected that a "1" cancel signal is generated with a certain delay with respect to the closing of the switch 460 and in this way a sufficient time is ensured for the complete erasure of the number of copies data.

The embodiment described so far with reference to FIGS. 2 and 4 has the following advantages:

(1) When a proper reading of a magnetic card is detected, it is indicated by the turning on and off of the light emitting diodes.
(2) Further, in response to the detection of the proper reading of a magnetic card, a number of copies data as well as the user's department recorded on the magnetic card are displayed.
(3) Due to the use of the memory means comprising an RAM, there is no need to provide as many counters as there are the storage locations, thus allowing the use of an inexpensive circuit construction.
(4) Due to the use of the switch adapted for the erasure of number of copies data, the copying machine can be managed, as for example, in a manner that the number of copies data in the respective storage locations are erased for every period of service.

The present invention is not intended to be limited to the above-mentioned embodiment, and many changes and modifications may be made to the embodiment without departing from the scope of the invention. For example, it is possible to use, in addition to reading means adapted to read magnetically the recorded information, reading means adapted as for example to read information from punched cards, cards having printed thereon patterns of dark and light bars, etc. Further, as regards the recording of information signals, it is possible to use, in addition to the F2F signals, any information signals in which data signals and clock signals are recorded separately from the beginning, those from which the desired data signals can be extracted, etc.

Further, in addition to the combination of the coincidence detection of ID information and the parity check used as an essential requisite for the detection of proper reading, many different detecting methods may be used. As a particular case, the necessary detection information may be recorded by a method of the type different from that used for the information recorded on the portable information record medium, thus making it possible to consider the detection of the information as an indication of the proper reading.

Still further, while, the general memory means is designed so that the stored and counted number of copies data is simply displayed in the form of a numeric value corresponding to the number of copies produced, the data may be displayed in terms of a monetary value. Still further, while, copying papers of different sizes may be used depending on the type of a copying machine, it is possible to change the weight of a number of copies data in accordance with the size of copying papers used. For instance, the copy pulse generating circuit of the copying machine may be designed so that two consecutive pulses are generated for every large copying paper used, and in this way the system shown in FIG. 4 can be used as such.

It will thus be seen from the foregoing detailed description that the present invention has a great advantage that the number of copies data recorded separately for the respective user's departments can be stored collectively, with the result that not only the management of number of copies data can be effected collectively for the respective user's departments, but also the respective user's departments can be allowed to use the copying machine by simply possessing a portable information record medium, thus extremely simplifying the management and use of the copying machine.

What we claim is:

1. In combination with a copying machine for performing copying operations in response to operation commands applied during the receipt of one of a plurality of portable mediums carrying respective user representative information, a management system comprising:
   means for recognizing the user representative information of the received portable medium to correspondingly produce an electric user representative signal;
   means for producing electric pulse signals in response to the copying operations of said copying machine;
   means for electronically storing a plurality of values in respective selectable addresses provided in correspondence with respective user representative information of said portable mediums and selected in accordance with said user representative signal, said storing means increasing the value stored in the selected address in response to each of said pulse signals; and
   a single means for electrically displaying one of said plurality of values in said storing means selectively when selected by said user representative signal.

2. A management system according to claim 1, wherein said storing means comprises:
   a plurality of counters for counting the number of said pulse signals, said counters being provided as said selectable addresses, respectively; and
   a control circuit for controlling the application of said pulse signals in accordance with said user representative signal such that said pulse signals are counted by one of counters corresponding to the received portable medium.

3. A management system according to claim 1, wherein said storing means comprises:
   a memory having a plurality of memory addresses corresponding to said selectable addresses respectively, the selected memory address memorizing an input value applied thereto; and
   an adder for adding one to a value stored in the selected memory address in response to each of said pulse signals, said adder applying the output value thereof the said memory as said input value.

4. A management system according to claim 1 further comprising:
   means for electricaly displaying the user representative information of the received portable medium in response to said user representative signal.

5. A management system for a copying machine, in which the copying machine is used by a plurality of departments of users jointly and the copying machine is adapted to be operable only when the operation signal is applied thereto and is adapted to generate a pulse signal every time a copy is produced, said management system comprising:
   information carrier means for carrying thereon information data identifying each of said departments of users;
   reading means for reading out said information data to produce a department signal indicative of a department identified;
   detecting means connected to said reading means for detecting whether the read out operation of said reading means is properly performed and for providing the operation signal to said copying machine;
   electronic memory means connected to receive said department signal from said reading means through said detecting means and to receive said pulse signal from said copying machine, said memory means having a plurality of storage locations and a counter control section thereby to retrieve one of said plurality of storage locations in accordance with said department signal and to store data representing a total number of copies produced by said department; and
   a single means for electrically displaying one of said plurality of data in said storing means selectively when selected by said department signal.

6. A management system according to claim 5, further comprising visual display means connected to said memory means for displaying indication of a department corresponding to the department identified by said reading means.

7. In combination with a copying machine for performing copying operations in response to operation commands applied during the receipt of one of a plurality of portable mediums carrying respective user representative information, a management system comprising:
   means for recognizing the user representative information of the received portable medium to correspondingly produce an electric user representative signal;
   means for producing electric pulse signals in response to the copying operations of said copying machine;
   means for electronically storing a plurality of values in respective selectable addresses provided in correspondence with respective user representative information of said portable mediums and selected in accordance with said user representative signal;
   a single means, responsive to each of said pulse signals, for incrementing one of said plurality of values in said storing means selectively when selected by said user representative signal; and a single means for electrically displaying one of said plurality of values in said storing means selectively when selected by said user representative signal.

8. A management system for a copying machine, in which the copying machine is used by a plurality of departments of users jointly and the copying machine is adapted to be operable only when an operation signal is applied thereto and is adapted to generate a pulse signal every time a copy is produced, said management system comprising:

card reading means for receiving a magnetic card carrying thereon information identifying each of said departments of users and for reading out said information to produce a department identification signal;

detecting means connected to said card reading means for detecting whether the read out operation of said card reading means is properly performed and for providing the operation signal to said copying machine;

memory means connected to receive said department identification signal from said reading means through said detecting means and to receive said pulse signal from said copying machine, said memory means including:

an electronic memory having a plurality of storage locations respectively for said plurality of departments of users, each of said storage locations being designated by an address corresponding to said department identification signal applied to said memory from said reading means, a timing pulse generating circuit for generating timing pulses at least including a read command signal and a write command signal, and an adder circuit receiving a read output signal delivered at a read terminal of said memory representing the number of reproduced copies and receiving said pulse signal thereby to produce the sum of the received two signals each time said pulse signal is received, said memory being adapted, upon receiving said read command signal, to retrieve a storage location designated by the address corresponding to said department identification signal to produce the read output signal cyclically at the read terminal, and upon receiving said write command signal, to write the output of said adder circuit in said designated storage location; and a single means connected to said card reading means and said memory for displaying an indication of a department corresponding to said department identification signal produced by said card reading means and for displaying numerically the read output signal delivered cyclically at the read terminal of said memory.

* * * * *